(12) United States Patent
Morozov et al.

(10) Patent No.: US 7,362,026 B2
(45) Date of Patent: Apr. 22, 2008

(54) HOMOPOLAR MULTI-FRAMES (CYLINDERS) GENERATOR-MOTOR

(76) Inventors: Dmitrii Morozov, 24 Kaspiiskaya Ulitsa, Korpus 1, Apartment 88, Moscow, 115304 (RU); Mikhail Pekker, 1101 Doublefile Trail, Round Rock, TX (US) 78664

( * ) Notice: Subject to any disclaimer, the term of this patent is extended or adjusted under 35 U.S.C. 154(b) by 0 days.

(21) Appl. No.: 11/221,345

(22) Filed: Sep. 6, 2005

(65) Prior Publication Data

US 2006/0049711 A1    Mar. 9, 2006

Related U.S. Application Data

(60) Provisional application No. 60/607,522, filed on Sep. 7, 2004.

(51) Int. Cl.
*H02K 31/00* (2006.01)
(52) U.S. Cl. .................................................. 310/178
(58) Field of Classification Search ................. 310/178
See application file for complete search history.

(56) References Cited

U.S. PATENT DOCUMENTS

| 3,293,470 | A | * | 12/1966 | Polgreen | 310/178 |
| 3,944,865 | A | * | 3/1976 | Jewitt | 310/178 |
| 4,208,600 | A | * | 6/1980 | Hatch | 310/178 |
| 6,051,905 | A | * | 4/2000 | Clark | 310/178 |
| 7,026,738 | B1 | * | 4/2006 | Lynch et al. | 310/178 |

* cited by examiner

*Primary Examiner*—Burton Mullins
(74) *Attorney, Agent, or Firm*—Larisa Migachyor

(57) ABSTRACT

An improved homopolar motor-generator having a hollow rotor, or a plurality of nested hollow rotors connected in series, with one magnetic pole of the stator located inside the rotor. This enables both sliding electrical contacts to be located close to the axis of rotation and thus decreases the linear velocity at the sliding contact. An alternative design of this invention comprises a hollow magnetized stator with an annular slot through which one or several Π-shaped current-carrying rods are free to rotate. The rods can also be embedded in a single cylindrical rotor. This design also enables the sliding electrical contacts to be located near the ends of the rods, and therefore close to the axis of rotation, and similarly decreases the linear velocity at the sliding contact.

6 Claims, 10 Drawing Sheets

Prior Art

HOMOPOLAR MULTI-FRAMES (CYLINDERS) GENERATOR-MOTOR

CROSS-REFERENCE TO RELATED APPLICATIONS

This application claims priority to Provisional Patent Application No. 60/607,522, filed on Sep. 7, 2004.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The present invention relates generally to DC and AC homopolar generators, motors, and engines, and more particularly to an improved homopolar motor-generator used in applications where the starting torque is very large, such as motor vehicle applications.

(2) Description of Related Art Including Information Disclosed Under 37 CFR 1.97 and 1.98

The original design of a homopolar motor-generator, with a stator that produces a magnetic field and a rotor through which current passes, was developed by Faraday (see FIG. 1). In such a motor, the current J goes through the conducting disk between contacts 1a and 1b and the resulting J×B force (where B is the strength of the magnetic field at the rotating disk) creates a torque causing the disk to rotate. The main problem with such homopolar devices is that they have a very small working voltage (about 2-3 V) and a very large working current, which makes it difficult to change generator (or motor) parameters such as torque.

One design to reduce the working current (or to increase the working voltage) was proposed by Mueller, in U.S. Pat. No. 3,586,894. The Mueller patent describes a homopolar multi-disk motor-generator (see FIG. 2). It proposes placing coaxial disks in the gap of the electromagnet, where the stator disks are fixed to the magnet assembly, and the rotor disks are fixed to the shaft. The stator and rotor disks are electrically in contact in such a way that the current passing through the disks is directed through all the rotor disks serially and in the same radial direction. The wires from the power supply are connected to the end rotor disks by the brush-type collector; the electrical contacts between the disks are provided by axially extending annular ribs on the disks. This way, the total torque at the shaft is the sum of the individual torques developed in each rotor disk; as a result, this machine would significantly reduce the working current (or, equivalently, increase the working voltage) of the homopolar motor-generator, compared with Faraday's original design as shown in FIG. 1.

However, the machine described in the Mueller patent has a significant problem: the electrical contacts between the disks constantly arc, leading to a significant temperature elevation and heat damage in the ribs even at moderate linear velocities between the stator and rotor disks. Using brush collectors at the outer edge of the rotor disk (see FIG. 2) can be a significant problem due to the large relative velocity between the disk and the brushes.

BRIEF SUMMARY OF THE INVENTION

The present invention comprises an improved homopolar motor-generator that uses a hollow rotor instead of a disk-shaped rotor, with one of the poles of the stator located inside the hollow rotor. The hollow shape of the rotor enables both of the sliding electrical contacts to be close to the axis of rotation, thus minimizing linear velocity between the stator and the rotor at both points of contact. The homopolar motor-generator can also use several nested hollow rotors connected in series, which increases the torque that the motor can produce and reduces the working current (or increases the working voltage).

An alternative design of this invention (the multi-rod homopolar motor-generator) comprises a stationary hollow magnet with an annular circumferential slot and a Π-shaped rod through which current passes, rotating within that slot. The Π-shaped rod is shaped so that both of the sliding electrical contacts (located at the ends of the rod) are close to the axis of rotation. Several such Π-shaped rods can be electrically in series in order to increase the torque that the motor can produce and reduce the working current or increase the working voltage.

DETAILED DESCRIPTION OF THE INVENTION

Figure 1:
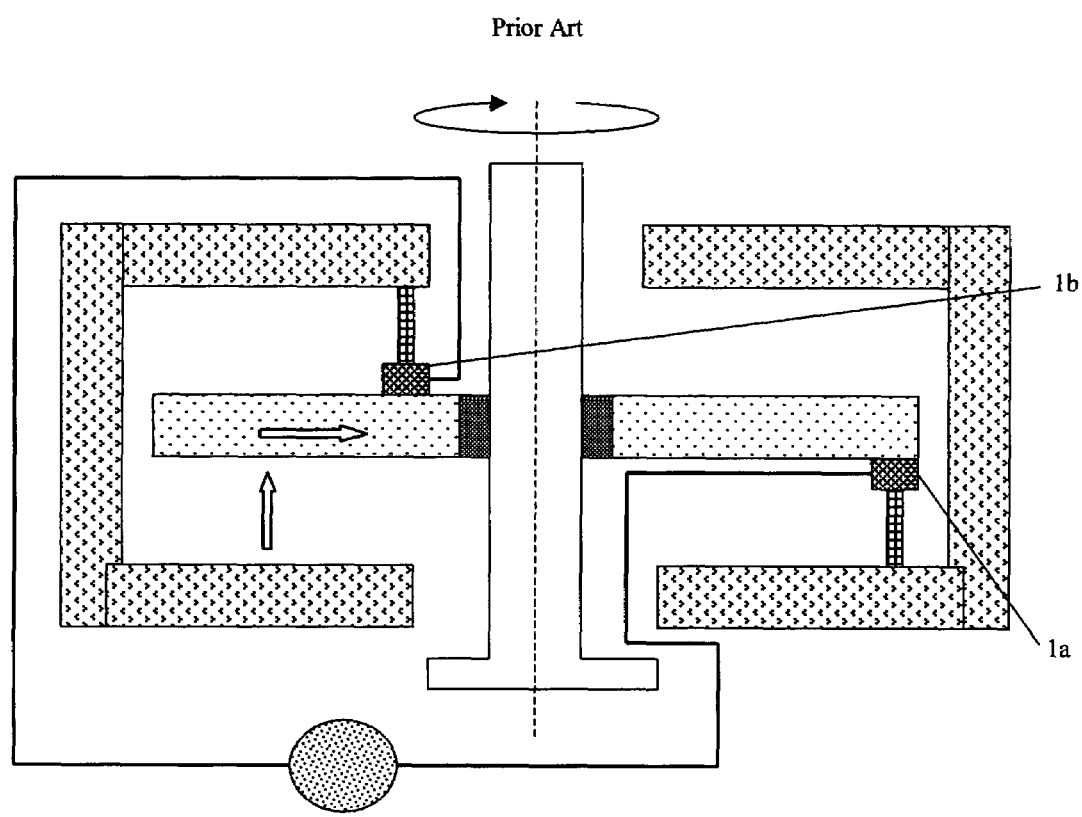
FIG. 1 is a cross-sectional view of the prior art design of a homopolar motor designed by Faraday.
Figure 2:
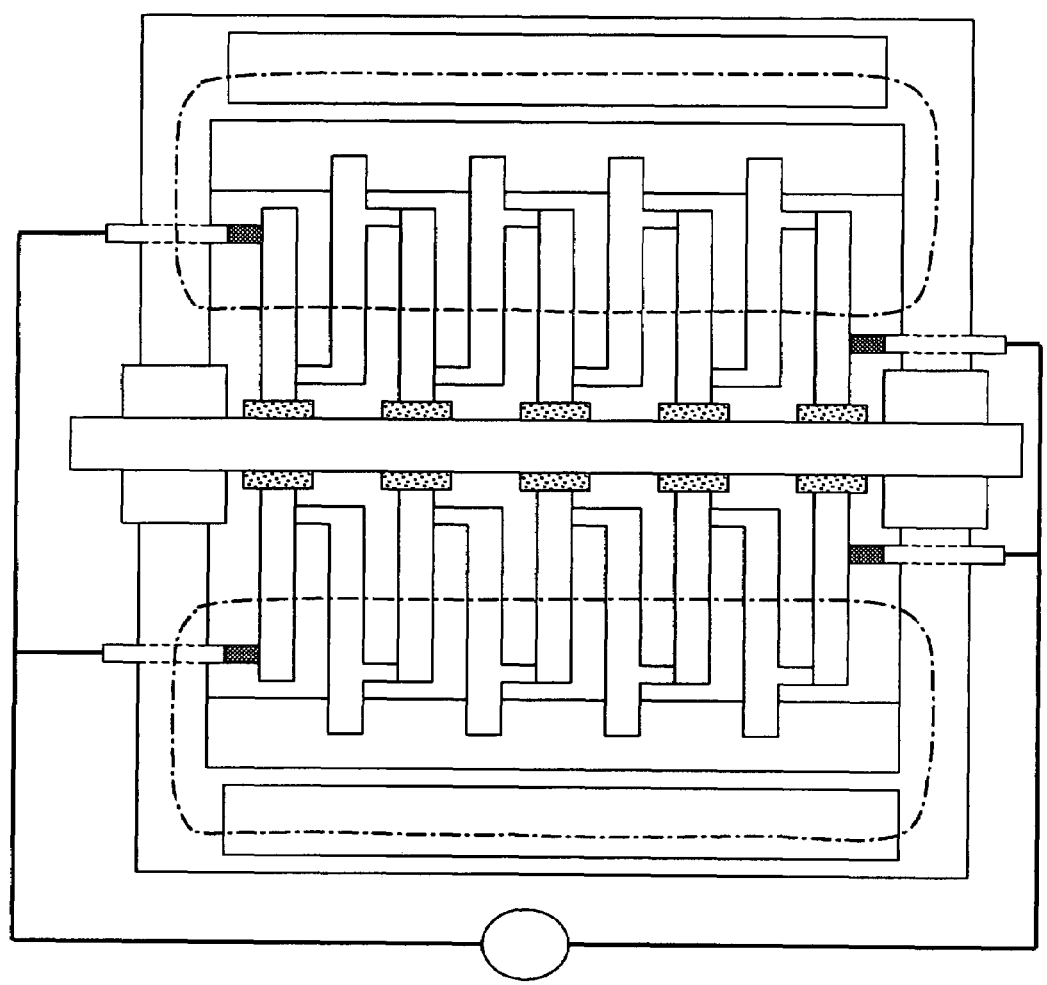
FIG. 2 is a cross-sectional view of the prior art design of a homopolar motor designed by Mueller (U.S. Pat. No. 3,586,894)
Figure 3A:
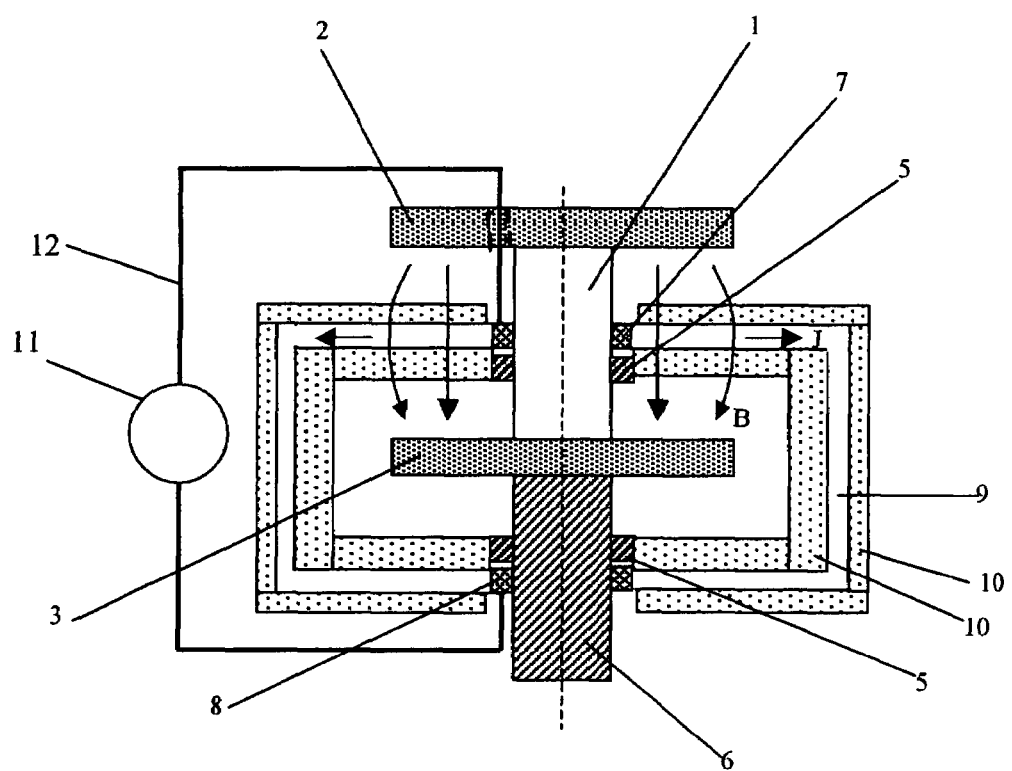
FIG. 3a is a cross-sectional view of a homopolar motor-generator comprising one hollow cylindrical rotor and a magnetic shaft that is a permanent magnet.

FIG. 3a shows the basic construction of the hollow rotor homopolar motor-generator. The stator comprises a magnetic shaft 1 (either a permanent magnet or an electromagnet) magnetized along its axis, with ferromagnetic disks 2 and 3 attached to the top and bottom of the magnet as shown. The upper disk 2 has a hole 5 for the wire connected to the sliding contact 7. A non-conductive and non-magnetic shaft 6 is attached to the bottom of the ferromagnetic disk 3. The sliding contact 7 and 8 are attached to the magnet shaft 1 and the non-magnetic shaft 6 with non-conductive bushings (not shown). The rotor is a hollow conductive cylinder 9 in an insulator housing 10; it is supported by bearings 4 and 5 in a manner that allows it to rotate freely around the shaft. Any other shape is acceptable for the rotor as well, as long as it is hollow and large enough inside to contain one pole of the stator within it. The power supply 11 is electrically connected to the sliding contacts 7 and 8 with wire 12.

Figure 3B:
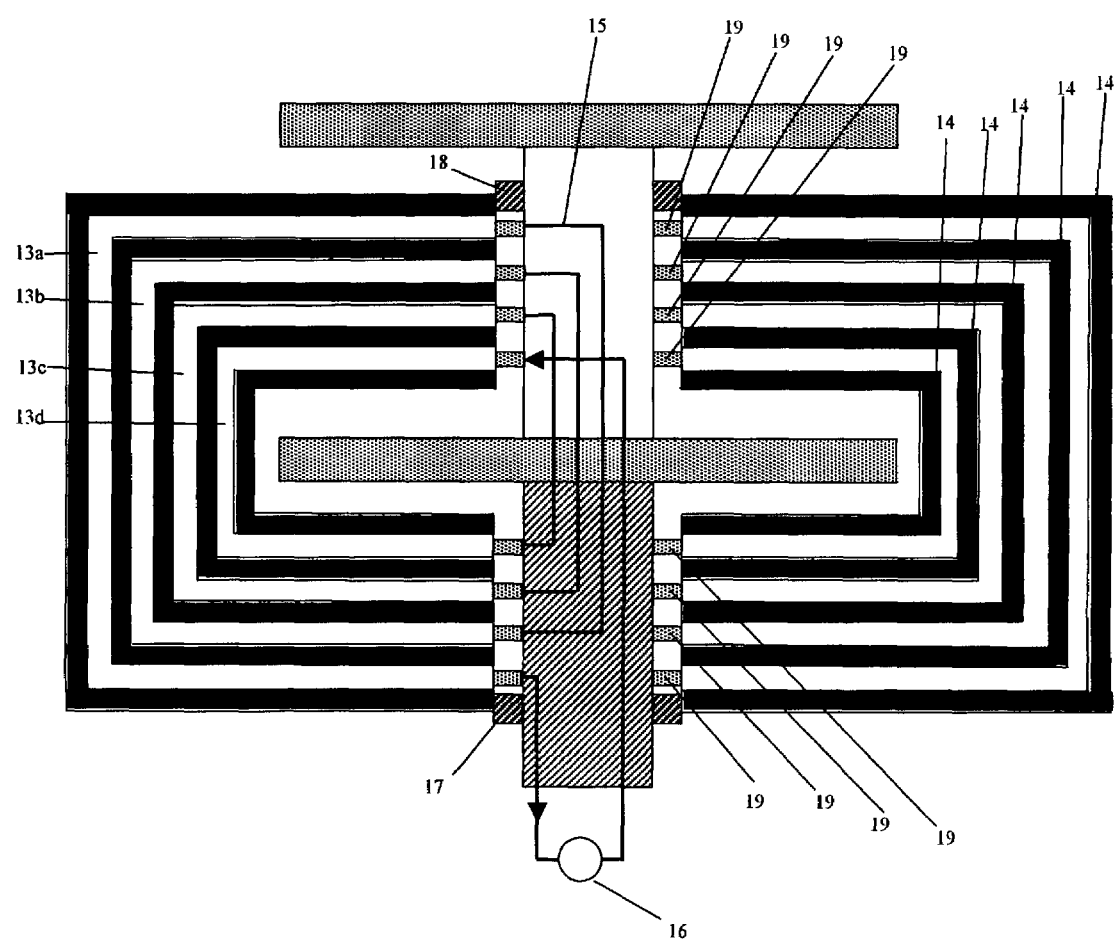
FIG. 3b is a cross-sectional view of a homopolar motor-generator comprising four nested hollow cylindrical rotors connected in series and a magnetic shaft that is a permanent magnet.

Connecting a plurality of nested hollow rotors electrically in series, as shown in FIG. 3b, increases the torque produced by the motor (or increases the current produced by the generator) by a factor equal to the number of rotors. The hollow rotors 13 are interspersed with nonconductive material 14 and connected in series with electrical connectors 15 at sliding contact 19. The outer rotor 13a and the inner rotor 13d are connected to the power supply 16. As in FIG. 3a, the entire assembly of nested rotors is supported by bearings 17 and 18.

Figure 3C:
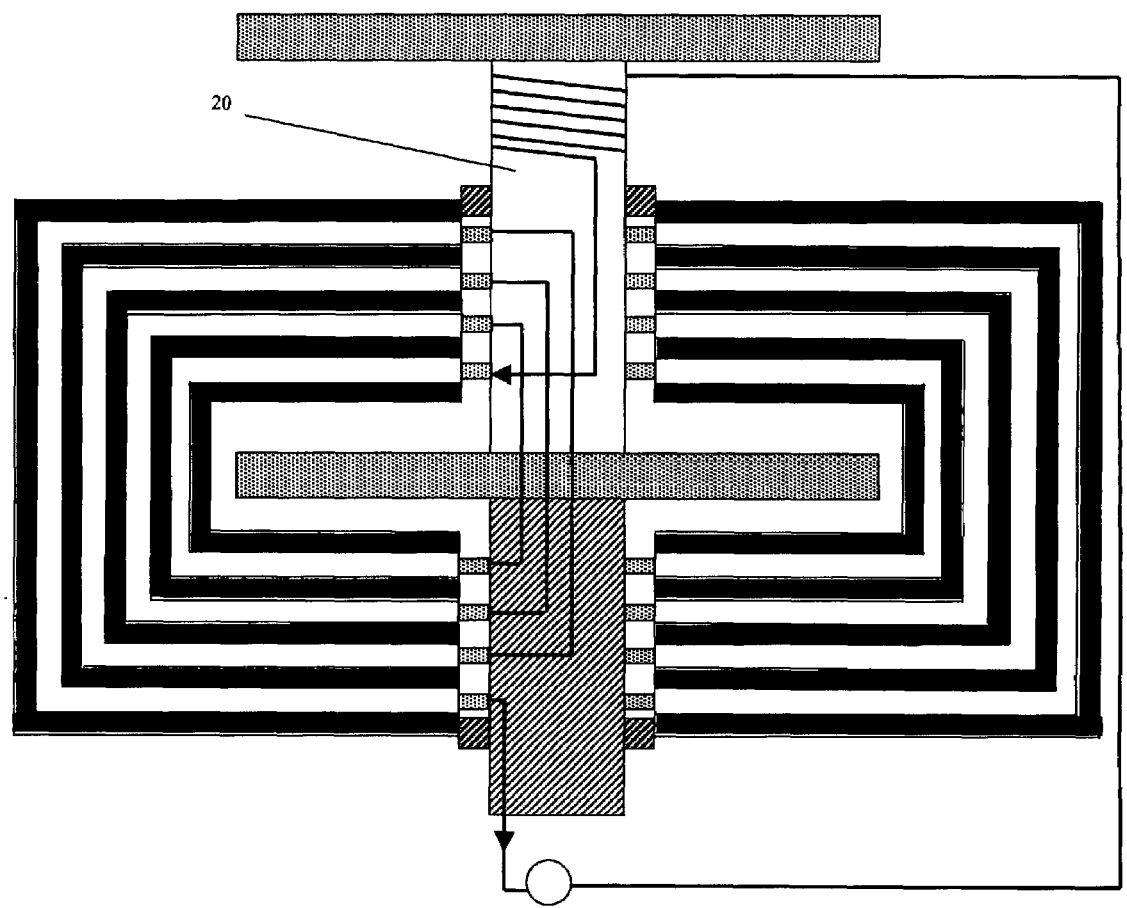
FIG. 3c is a cross-sectional view of a homopolar motor-generator comprising four nested hollow cylindrical rotors connected in series and a magnetic shaft that is a coil magnet.

As shown in FIG. 3c, the design of FIG. 3b can also be made using an electromagnetic shaft 20 instead of a shaft that is a permanent magnet. If an electromagnetic shaft is used, the motor can run on alternating current.

Figure 4A:
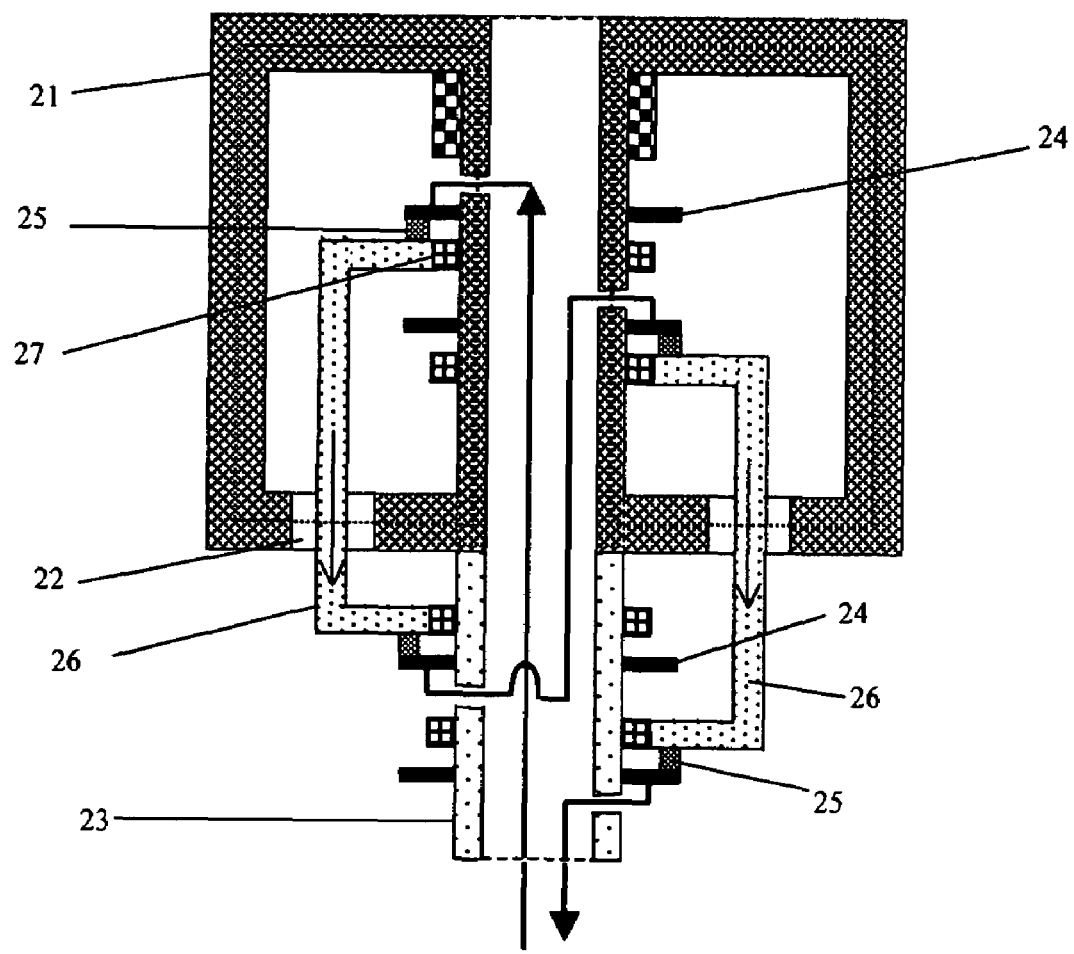
FIG. 4a is a cross-sectional view of a homopolar motor-generator comprising a hollow permanent magnet with an annular slot and two Π-shaped rods passing through the annular slot.

FIG. 4a shows the basic construction of the multiple-rod homopolar motor-generator. The stator comprises a hollow cylindrical magnetized housing 21 with an annular slot 22 on the bottom side of the housing. The housing can be a permanent magnet or an electromagnet. Any shape other than a cylinder is acceptable for the housing as well, as long as it is hollow and contains an annular slot. A nonmagnetic and nonconductive tubular shaft 23 is attached to the bottom of the housing. FIG. 4d shows two views of the outside of the housing. The view on the right shows the annular slot on the bottom of the housing. The inside of the tubular nonconductive shaft and the cylindrical magnetized housing can be used for wiring. Conductive rings with dielectric bushings 24 are attached to the inside of the housing 21 and to the nonconductive tubular shaft 23 and are used as stationary contacts for the sliding electrical contacts 25 of the rods 26. As in the hollow-cylinder design, either one rod or multiple rods could be used in the rotor (FIG. 4a shows a design with two rods). Current flows through each rod 26 in the direction of the arrow. The rods are free to rotate around the axis of the motor on bearings 27. FIG. 4c shows two views of a rod; sliding contacts 28 protrude from the rod as shown. Since the annular slot in the housing creates a magnetic field that is orthogonal to the direction of the current, a force of J×B will act on each rod, where J is the current flowing through the rod and B is the magnetic field in the annular slot. As in the multi-cylinder homopolar motor-generator, increasing the number of rods increases the torque the motor can produce (or increases the current the generator can produce).

Figure 4B:
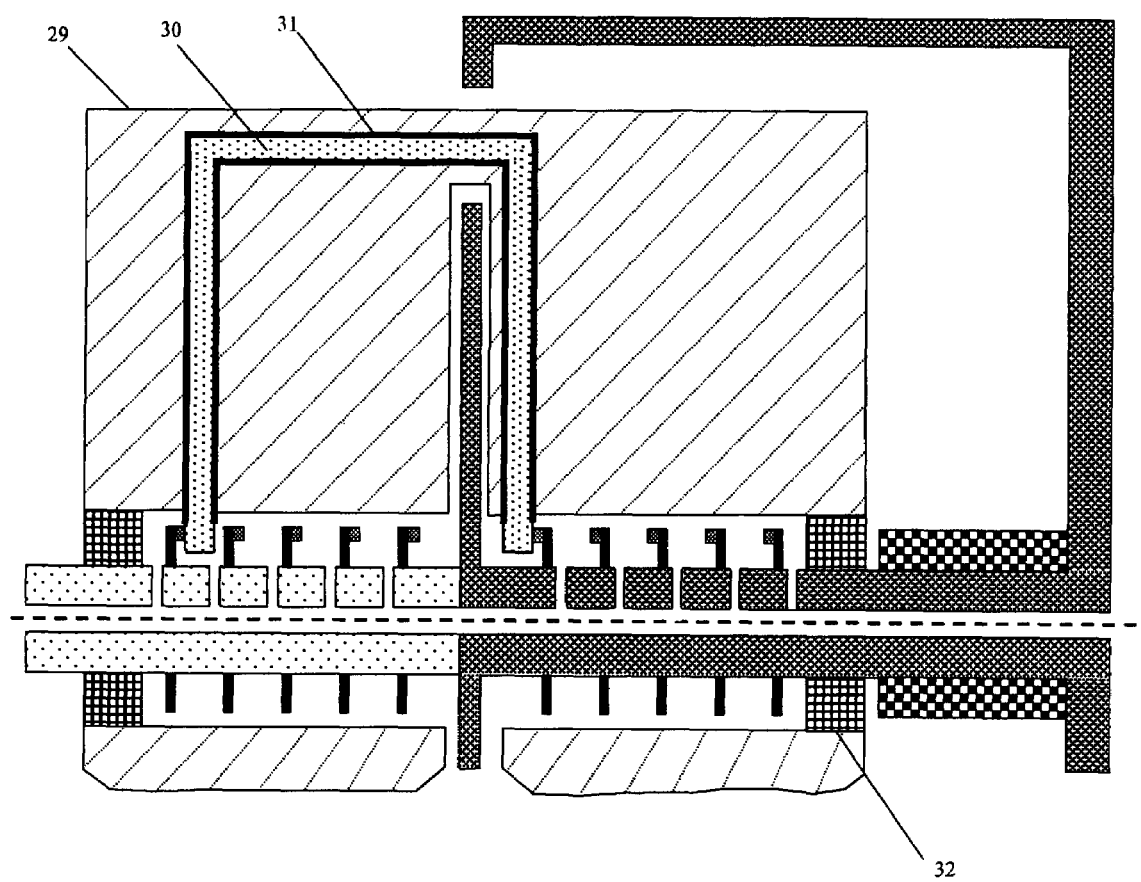
FIG. 4b is a cross-sectional view of a homopolar motor-generator comprising a hollow permanent magnet with an annular slot, one Π-shaped rod embedded in a rotating block of nonmagnetic material, and connectors for four more Π-shaped rods.
Figure 4C:
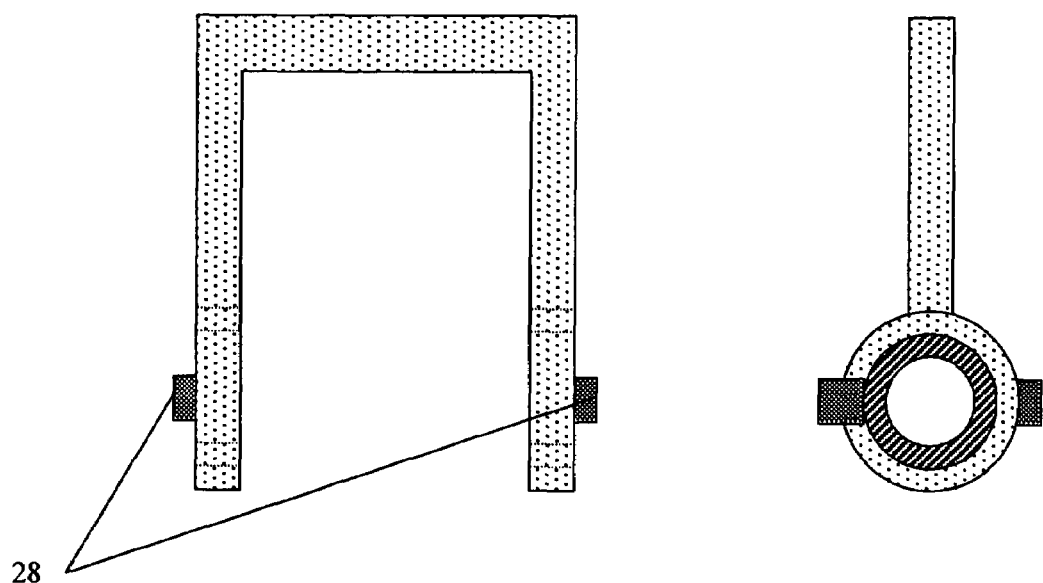
FIG. 4c shows two views of a Π-shaped rod.
Figure 4D:
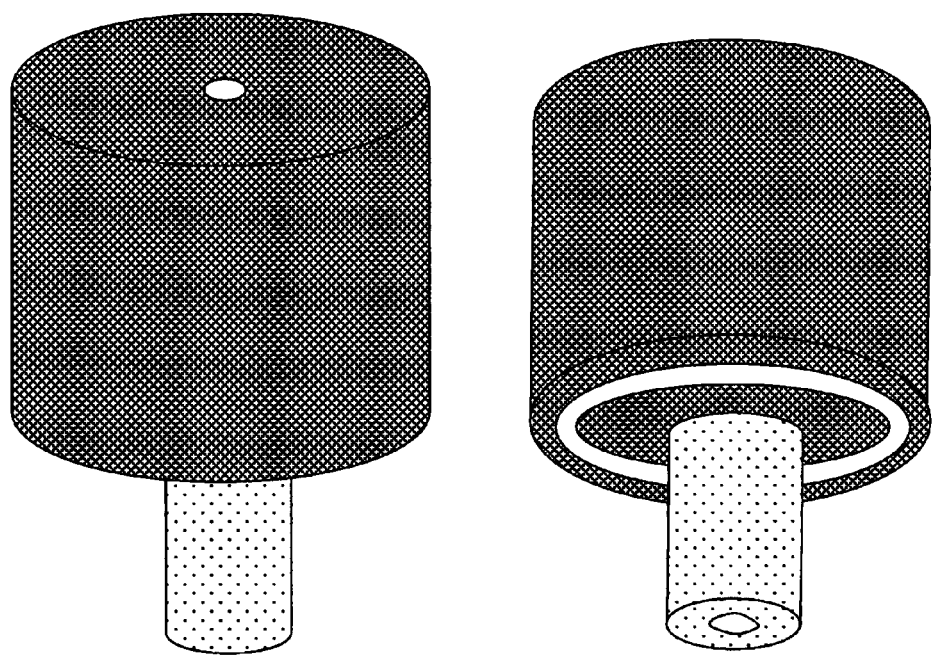
FIG. 4d shows two views of the hollow permanent magnet with an annular slot.
Figure 5:
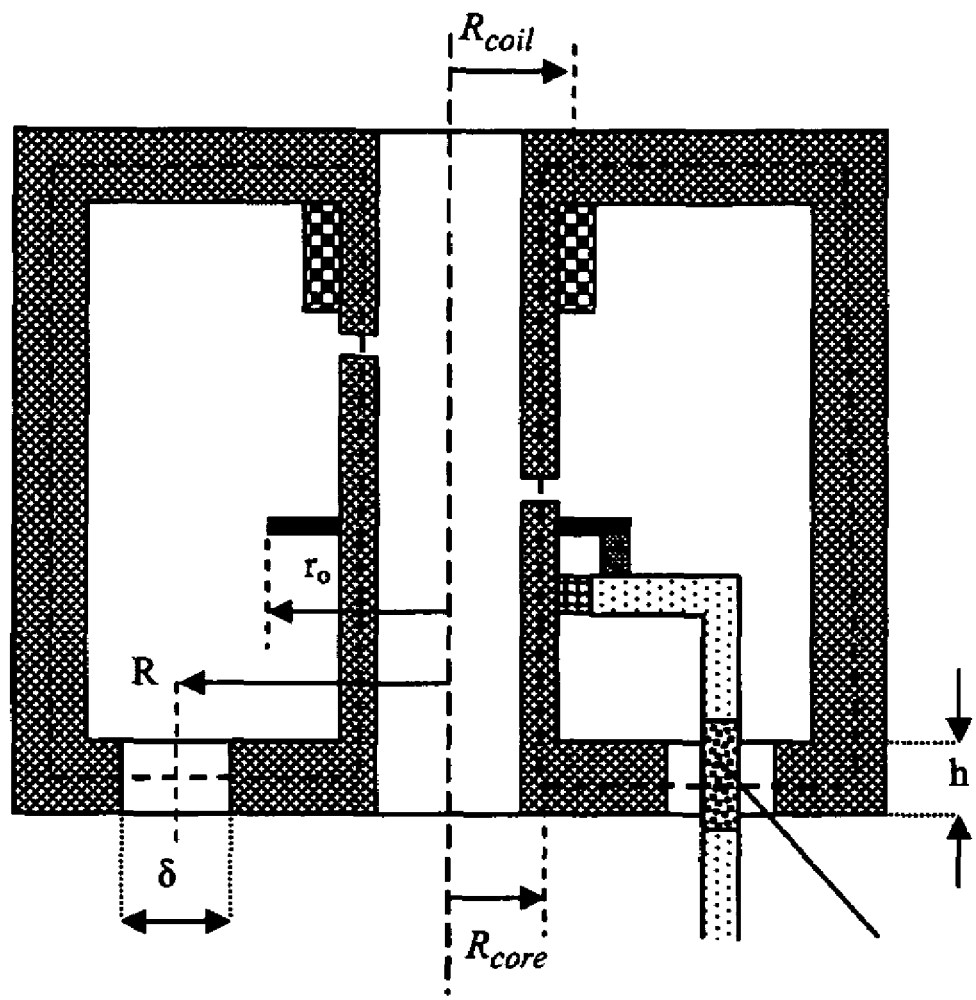

FIG. 4b shows an alternative embodiment of this design. In this embodiment, the rods 30 (only one rod is shown) are embedded in a single cylindrical rotor 29, and insulated from the rotor material by insulation 31. The cylindrical rotor rotates on bearings 32. This avoids the unbalanced centrifugal forces that would otherwise be produced on the core of the electromagnet due to the rotation of the rods.

We claim:

1. A homopolar motor-generator, comprising:
    a) a hollow rotor, said rotor comprising two electrical contact means, both of which are located near the rotational axis of the rotor;
    b) a stator, comprising:
       a first shaft, said shaft having a first end and a second end;
       a means for producing a magnetic field parallel to the axis of said first shaft, one pole of said magnetic field located near the second end of said first shaft and inside said hollow rotor;
       a second shaft, made of a nonmagnetic and nonconductive material, attached to the second end of said first shaft;
       a means for completing an electric circuit through said hollow rotor, connected to said electrical contact means in such a way as to leave the rotor able to rotate freely.

2. A homopolar motor-generator, comprising:
    a) a plurality of nested hollow rotors, each rotor comprising two electrical contact means located near the rotational axis of the rotor;
    b) a stator, comprising:
       a first shaft, said shaft having a first end and a second end;
       a means for producing a magnetic field parallel to the axis of said first shaft, one pole of said magnetic field located near the second end of said first shaft and inside said hollow rotor;
       a second shaft, made of a nonmagnetic and nonconductive material, attached to the second end of said first shaft;
       a means for completing an electric circuit through said hollow rotors, connected to said electrical contact means in such a way as to connect said hollow rotors in series and to leave the rotors able to rotate freely.

3. A homopolar motor-generator, comprising:
    a) a stator, comprising:
       a hollow magnetized housing with an annular slot on the bottom of the housing, magnetized in such a way as to produce a magnetic field in a direction perpendicular to the annular slot;
       a nonmagnetic and nonconductive tubular shaft attached to the bottom of said housing, coaxial to said annular slot;
       a cylindrical core located in said housing coaxial to said shaft;
    b) a rotor, comprising:
       a rod passing through said annular slot in a direction perpendicular to that of the magnetic field in said annular slot;
       bearing means attached to each end of said rod;
       electrical contact means attached near each end of said rod;
       said rod shaped in such a way as to enable one of said bearing means to be attached to the inner core of the housing, and the other one to be attached to the nonmagnetic tubular shaft;
    c) said stator also comprising a means for completing an electric circuit through said rod, connected to said electrical contact means in such a way as to leave the rod able to rotate freely.

4. A homopolar motor-generator, comprising:
a) a stator, comprising:
- a hollow magnetized housing with an annular slot on the bottom of the housing, magnetized in such a way as to produce a magnetic field in a direction perpendicular to the annular slot;
- a nonmagnetic and nonconductive tubular shaft attached to the bottom of said housing, coaxial to said annular slot;
- a cylindrical core located in said housing coaxial to said shaft;

b) a rotor, comprising:
- a plurality of rods, passing through said annular slot in a direction perpendicular to that of the magnetic field in said annular slot, said rods being of such a thickness as to be able to move freely along the annular slot;
- bearings attached to each end of each rod;
- said rods shaped in such a way as to enable one of said bearings to be attached to the inner core of the housing, and the other one to be attached to the nonmagnetic tubular shaft;
- electrical contact means attached close to each end of each rod;

c) said stator also comprising a means for completing an electrical circuit through each rod, connected to said electrical contact means in such a way as to leave the rods able to rotate freely;

d) said rods being electrically connected in series.

5. A homopolar motor-generator, comprising:
a) a stator, comprising:
- a hollow magnetized housing with an annular slot on the bottom of the housing, magnetized in such a way as to produce a magnetic field in a direction perpendicular to the annular slot;
- a nonmagnetic and nonconductive shaft attached to the bottom of said housing, coaxial to said annular slot;
- a cylindrical core located in said housing, coaxial to said shaft;

b) a rotor, comprising:
- a plurality of rods, each rod passing through said annular slot in a direction perpendicular to that of the magnetic field in said annular slot;
- each rod shaped in such a way as to enable both ends of the rod to be close to the axis of rotation;
- said rods being connected electrically in series;
- said rods embedded in a cylindrical rotor in such a way as to insulate the rods from the cylindrical rotor;
- bearing means attached to said rotor so as to enable it to rotate freely;

c) said stator also comprising a means for completing an electrical circuit through each rod, connected to said electrical contact means in such a way as to leave the rods able to rotate freely;

d) said rods being electrically connected in series.

6. A homopolar motor-generator as in claims 4 or 5, further comprising:
a) a hole parallel to the axis of rotation, passing through the nonconductive shaft of the stator and the core of the housing, of such a dimension as to permit electrical wires to pass through said hole.

* * * * *

UNITED STATES PATENT AND TRADEMARK OFFICE
CERTIFICATE OF CORRECTION

| | | |
|---|---|---|
| PATENT NO. | : 7,362,026 B2 | Page 1 of 1 |
| APPLICATION NO. | : 11/221345 | |
| DATED | : April 22, 2008 | |
| INVENTOR(S) | : Dmitrii Morozov and Mikhail Pekker | |

It is certified that error appears in the above-identified patent and that said Letters Patent is hereby corrected as shown below:

Title Page, Item (54) and at Column 1, lines 1 and 2,

Change the title of the patent from "Homopolar Multi-Frames (Cylinders) Generator-Motor" to "Homopolar Multi-Frame (Cylinder) Generator-Motor"

Title Page, Item (74) Attorney, Agent, or Firm change "Migachyor" to "Migachyov"

Signed and Sealed this
Fourteenth Day of June, 2011

David J. Kappos
*Director of the United States Patent and Trademark Office*